United States Patent
Matsuura et al.

(10) Patent No.: US 6,343,253 B1
(45) Date of Patent: Jan. 29, 2002

(54) ROAD SHAPE ESTIMATION APPARATUS AND CURVE APPROACH CONTROL APPARATUS

(75) Inventors: Munenori Matsuura; Akira Takahashi, both of Mitaka (JP)

(73) Assignee: Fuji Jukogyo Kabushiki Kaisha, Tokyo-To (JP)

(*) Notice: Subject to any disclaimer, the term of this patent is extended or adjusted under 35 U.S.C. 154(b) by 0 days.

(21) Appl. No.: 09/665,673

(22) Filed: Sep. 20, 2000

(30) Foreign Application Priority Data

Sep. 21, 1999 (JP) ............................. 11-267734

(51) Int. Cl.[7] .............................................. G08G 1/16
(52) U.S. Cl. .................... 701/200; 701/208; 701/70; 340/438; 340/441
(58) Field of Search .................................. 701/200, 208, 701/70, 28, 23; 340/438, 441, 425.5

(56) References Cited

U.S. PATENT DOCUMENTS 6,185,496 B1 * 2/2001 Matsuno ...................... 701/70
6,188,316 B1 * 2/2001 Matsuno et al. ............. 340/441
6,208,927 B1 * 3/2001 Mine et al. .................... 701/70

FOREIGN PATENT DOCUMENTS

| JP | 4-236699 | 8/1992 |
|---|---|---|
| JP | 8-2274 | 1/1996 |
| JP | 11-2528 | 1/1999 |
| JP | 11-83501 | 3/1999 |
| JP | 11-232600 | 8/1999 |

* cited by examiner

Primary Examiner—William A. Cuchlinski, Jr.
Assistant Examiner—Marthe Marc-Coleman
(74) Attorney, Agent, or Firm—Smith, Gambrell & Russell, LLP

(57) ABSTRACT

A curve's radius of curvature that approximates the actual curve is calculated, and an appropriate allowable curve approach speed even when the node interval is extremely short is set. Although the node c with a relatively large positional deviation on the curve is not out of the actual road width, the road geometry indicated by a series of nodes is locally bent like a concave at around the node c, constituting a curve that cannot exist in reality. The interval between nodes b and c is short, so that calculating the curve's radius of curvature at nodes b and c may result in a very small curve's radius of curvature which is far smaller than the actual curve geometry. Therefore, at least one of the nodes is taken as the curve's radius of curvature calculation removal point and is not used for the calculation of the curve's radius of curvature.

21 Claims, 12 Drawing Sheets

ROAD SHAPE ESTIMATION APPARATUS AND CURVE APPROACH CONTROL APPARATUS

BACKGROUND OF THE INVENTION

1. Field of the Invention

The present invention relates to a road shape estimation apparatus to eliminate improper nodes for calculating a radius of curvature for a curve and to a curve approach speed control apparatus using the road shape estimation apparatus.

2. Description of the Related Art

JP-A-4-236699 proposes a vehicle traveling system which calculates an allowable approach speed for a curve in front by using data (node data) on points in ground (nodes) shown on a road map of a navigation device, detects a speed higher than the allowable approach speed, i.e., an overspeed state for the curve in front, and issues an alarm or perform a speed reduction control.

The applicant of this invention has proposed in JP-A-11-2528 a method for determining a radius of curvature for a curve based on a plurality of node data output from the navigation device.

That is, for three consecutive nodes, the center node and the two other nodes on both sides are connected with straight lines, and the lengths of the two straight lines are compared. A half the length of the shorter straight line is taken from the center node on both straight lines to find mid points. At the mid points normal lines perpendicular to their own straight lines are drawn until they intersect each other. The distance from the point of intersection to each mid point is set as a radius of curvature for a curve.

A method in JP-A-11-83501 calculates, based on a radius of curvature for a curve and a lateral acceleration, an allowable curve approach speed at which the vehicle can safely negotiate the curve in front, compares the allowable curve approach speed with the car speed in a predetermined procedure to check whether the curve can be safely negotiated, and, if the decision indicates an overspeed, issues an alarm prompting the user to decrease the speed or forcibly performs a speed reduction control as required.

When calculating the curve's radius of curvature based on the distances between the three consecutive nodes, if the node distances are extremely short, the curve's radius of curvature based on half the node distance is likely to be calculated far smaller than the actual curve's radius of curvature. As a result, if the allowable curve approach speed is calculated based on the erroneously calculated curve's radius of curvature, it will be set to an extremely slow speed, giving rise to a problem that even when the car is actually traveling at a speed at which it can safely negotiate the curve, an alarm may be issued or the speed reduction control activated, making the driver feel incongruous.

SUMMARY OF THE INVENTION

The present invention has been accomplished under these circumstances to provide a road shape estimation apparatus and a curve approach speed control apparatus using the road shape estimation apparatus, which, even when the node intervals are extremely short, can calculate a curve's radius of curvature approximating the actual curve, set an appropriate allowable curve approach speed and thereby alleviate a sense of incongruity from the driver.

To achieve the above objective, a first road shape estimation apparatus according to the present invention comprises inputting a plurality of node data concerning a road in front from a navigation device, calculating, based on the node data, a node interval between each node and an adjacent node and a node angle for each node, and, based on the node intervals and the node angles, calculating a curve's radius of curvature for each node, wherein the road shape estimation apparatus detects, based on the node intervals and the node angles, a node which constitutes a curve's radius of curvature calculation removal point, and calculates the curve's radius of curvature by removing the node which constitutes the curve's radius of curvature calculation removal point.

In this configuration, when inputting a plurality of node data concerning a road in front from a navigation device, calculating, based on the node data, a node interval between each node and an adjacent node and a node angle for each node, and, based on the node intervals and the node angles, calculating a curve's radius of curvature for each node, the apparatus detects, based on the node intervals and the node angles, a node which constitutes a curve's radius of curvature calculation removal point, and calculates the curve's radius of curvature by removing the node which constitutes the curve's radius of curvature calculation removal point.

A second road shape estimation apparatus is characterized in that, in the first road shape estimation apparatus, when the node interval is equal to or less than a preset node interval, at least one of nodes at both ends of the node interval is taken as the curve's radius of curvature calculation removal point.

With this configuration, when the node interval is equal to or less than a preset node interval, at least one of nodes at both ends of the node interval is taken as the curve's radius of curvature calculation removal point.

A third road shape estimation apparatus is characterized in that, in the first road shape estimation apparatus, when the node interval is equal to or less than a preset node interval and bending directions of the node angles calculated at the two nodes situated at the both ends of the node interval are opposite, at least one of the two nodes is taken as the curve's radius of curvature calculation removal point.

With this configuration, when the node interval is equal to or less than a preset node interval and bending directions of the node angles calculated at the two nodes situated at the both ends of the node interval are opposite, at least one of the two nodes is taken as the curve's radius of curvature calculation removal point.

A fourth road shape estimation apparatus is characterized in that, in the first road shape estimation apparatus, when the node interval is equal to or less than a preset node interval and a larger one of the node angles calculated at the two nodes situated at the both ends of the node interval is equal to or more than a preset maximum threshold angle, at least one of the two nodes is taken as the curve's radius of curvature calculation removal point.

With this configuration, when the node interval is equal to or less than a preset node interval and a larger one of the node angles calculated at the two nodes situated at the both ends of the node interval is equal to or more than a preset maximum threshold angle, at least one of the two nodes is taken as the curve's radius of curvature calculation removal point.

A fifth road shape estimation apparatus is characterized in that, in the first road shape estimation apparatus, when the node interval is equal to or less than a preset node interval and a smaller one of the node angles calculated at the two nodes situated at the both ends of the node interval is equal to or less than a preset minimum threshold angle, at least one of the two nodes is taken as the curve's radius of curvature calculation removal point.

With this configuration, when the node interval is equal to or less than a preset node interval and a smaller one of the node angles calculated at the two nodes situated at the both ends of the node interval is equal to or less than a preset minimum threshold angle, at least one of the two nodes is taken as the curve's radius of curvature calculation removal point.

A sixth road shape estimation apparatus is characterized in that, in the first road shape estimation apparatus, when an angle formed by a line connecting first two of four consecutive nodes and a line connecting last two nodes is equal to or less than a preset minimum threshold angle and a node interval connecting two middle nodes is equal to or less than a preset node interval, at least one of the two middle nodes is taken as the curve's radius of curvature calculation removal point.

With this configuration, when an angle formed by a line connecting first two of four consecutive nodes and a line connecting last two nodes is equal to or less than a preset minimum threshold angle and a node interval connecting two middle nodes is equal to or less than a preset node interval, at least one of the two middle nodes is taken as the curve's radius of curvature calculation removal point.

A seventh road shape estimation apparatus is characterized in that, in the second road shape estimation apparatus, the preset node interval is set by multiplying a preset node interval calculation coefficient by a road width coefficient.

With this configuration, the preset node interval is set by multiplying a preset node interval calculation coefficient by a road width coefficient.

A eighth road shape estimation apparatus is characterized in that, in the seventh road shape estimation apparatus, the preset node interval calculation coefficient is set for each road kind.

With this configuration, the preset node interval calculation coefficient is set for each road kind.

A ninth road shape estimation apparatus is characterized in that, in the fourth road shape estimation apparatus, the maximum threshold angle or the minimum threshold angle is set by multiplying a preset reference angle by a ratio between the node interval and the preset node interval.

With this configuration, the maximum threshold angle or the minimum threshold angle is set by multiplying a preset reference angle by a ratio between the node interval and the preset node interval.

A first curve approach control apparatus using any one of the first to ninth road shape estimation apparatus is characterized in that when a node interval between two nodes adjacent to, and on both sides of, the node which is taken as the curve's radius of curvature calculation removal point is equal to or less than a preset node interval, an alarm or deceleration control for at least one of the two nodes is prohibited.

With this configuration, when a node interval between two nodes adjacent to, and on both sides of, the node which is taken as the curve's radius of curvature calculation removal point is equal to or less than a preset node interval, an alarm or deceleration control for at least one of the two nodes is prohibited.

A second curve approach control apparatus using any one of the first to ninth road shape estimation apparatus is characterized in that when a curve angle of at least one of two nodes adjacent to, and on both sides of, the node which is taken as the curve's radius of curvature calculation removal point is equal to or less than the preset minimum threshold angle, an alarm or deceleration control for the at least one node is prohibited.

With this configuration, when a curve angle of at least one of two nodes adjacent to, and on both sides of, the node which is taken as the curve's radius of curvature calculation removal point is equal to or less than the preset minimum threshold angle, an alarm or deceleration control for the at least one node is prohibited.

DESCRIPTION OF THE PREFERRED EMBODIMENTS

Figure 1:
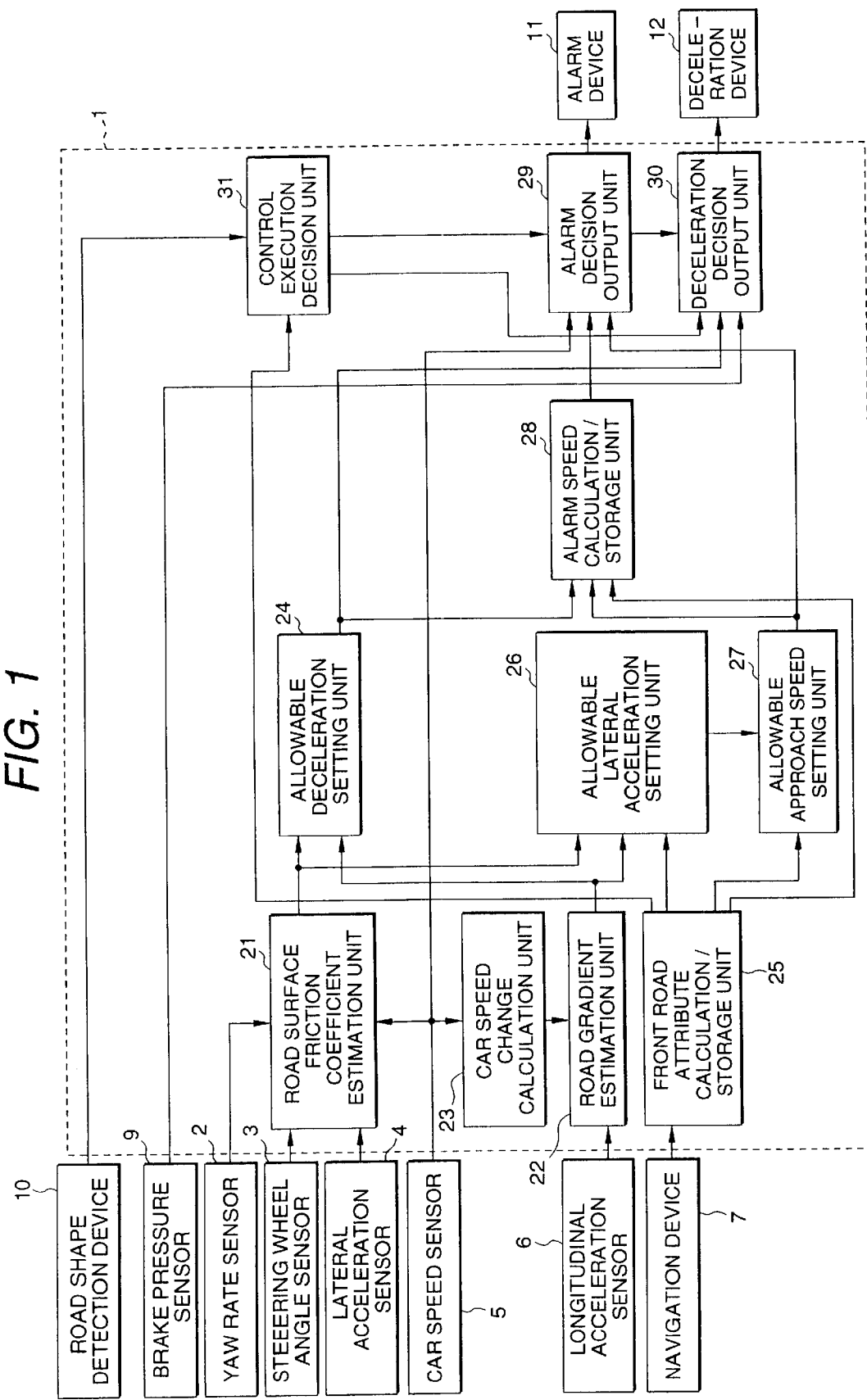
FIG. 1 is a functional block diagram of the control unit installed in the curve approach control apparatus.

One embodiment of the present invention will be described by referring to the accompanying drawings. FIG. 1 shows a functional block diagram of a control unit installed in the curve approach control apparatus.

A control unit 1 of the curve approach control apparatus receives at its input side various data including a yaw rate τ detected by a yaw rate sensor 2, a rudder angle δf detected by a steering wheel angle sensor 3, a lateral acceleration Gy detected by a lateral acceleration sensor 4, a car speed V detected by a car speed sensor 5, a longitudinal acceleration detected by a longitudinal acceleration sensor 6, and a brake pressure detected by a brake pressure sensor 9. The control unit 1 also receives signals from a navigation device 7 and a road shape detection device 10.

Figure 3:
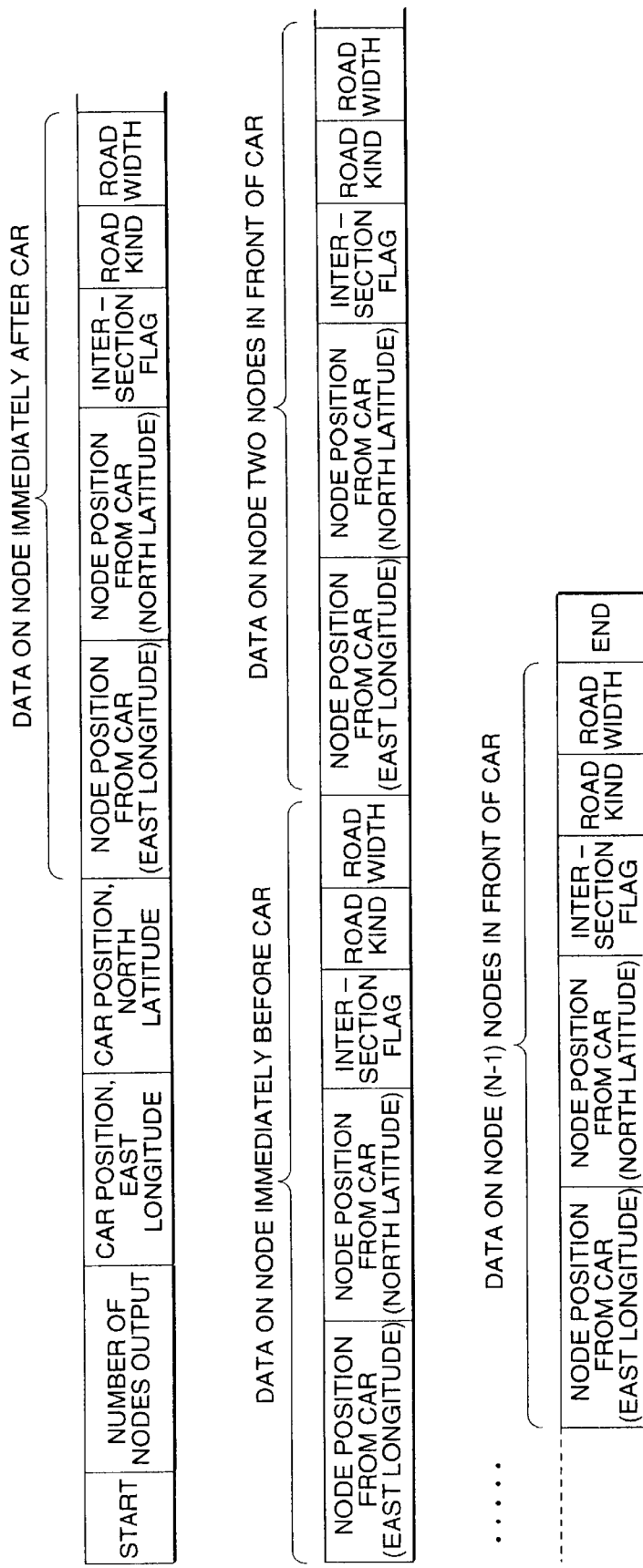
FIG. 3 is an explanatory diagram of information output from the navigation device.

As shown in FIG. 3, the navigation device 7 periodically (every 500 ms, for example) issues information including a node number n along a car travel route, an east longitude of car position and a north latitude of car position, data on the node directly after the car, data on the node directly before the car, data on the second node in front of the car, data on the (n−1)th node in front of the car.

The road shape detection device 10 detects the state of a curve (direction of curve, radius of curvature, etc.) of the road in front by using a CCD camera and outputs the information to the control unit 1.

Based on the information detected by the sensors 2–6, 9, the navigation device 7 and the road shape detection device 10, the control unit 1 performs calculation to check whether the car can negotiate the curve in front stably when it enters the curve at the present speed, and drives an alarm device 11 such as a buzzer, a voice alarm or an alarm lamp to alert the operator, if necessary.

When the speed must be lowered forcibly, a deceleration command is issued to a deceleration device 12. The deceleration device 12, according to the deceleration command from the control unit 1, performs a deceleration control such as downshifting of the transmission, lowering the engine torque and applying brake.

In the control unit 1 shown in FIG. 1, a road surface friction coefficient estimation unit 21 estimates a road surface friction coefficient $\mu$ based on parameters representing the behavior of the car, such as yaw rate $\tau$, rudder angle $\delta f$, lateral acceleration Gy and car speed V, by using a calculation method disclosed in JP-A8-2274 already filed by the applicant of this invention. A road gradient estimation unit 22 estimates a road gradient SL according to the rate of change of the car speed V calculated in a car speed change calculation unit 23 every set duration of time and the longitudinal acceleration.

Based on the road condition determined from the road surface friction coefficient $\mu$ and the road gradient SL, an allowable deceleration setting unit 24 sets an allowable deceleration XgLim for the car. The method of estimating the road gradient SL and the method of calculating the allowable deceleration XgLim are described in JP-A-11-83501 already filed by the applicant of this invention and therefore their explanations are omitted here.

A front road attribute calculation/storage unit 25 reads information (see FIG. 3) for each node output from the navigation device 7, calculates, based on these information, an interval between the current node and the node directly in front Lp[j] for each node, a curve's radius of curvature rp[j] and others, and stores the calculated data as node attributes in a storage means such as RAM. The intersection attribute ip[j], road width attribute wp[j] and others are also stored as node attributes in the storage means.

Figure 2:
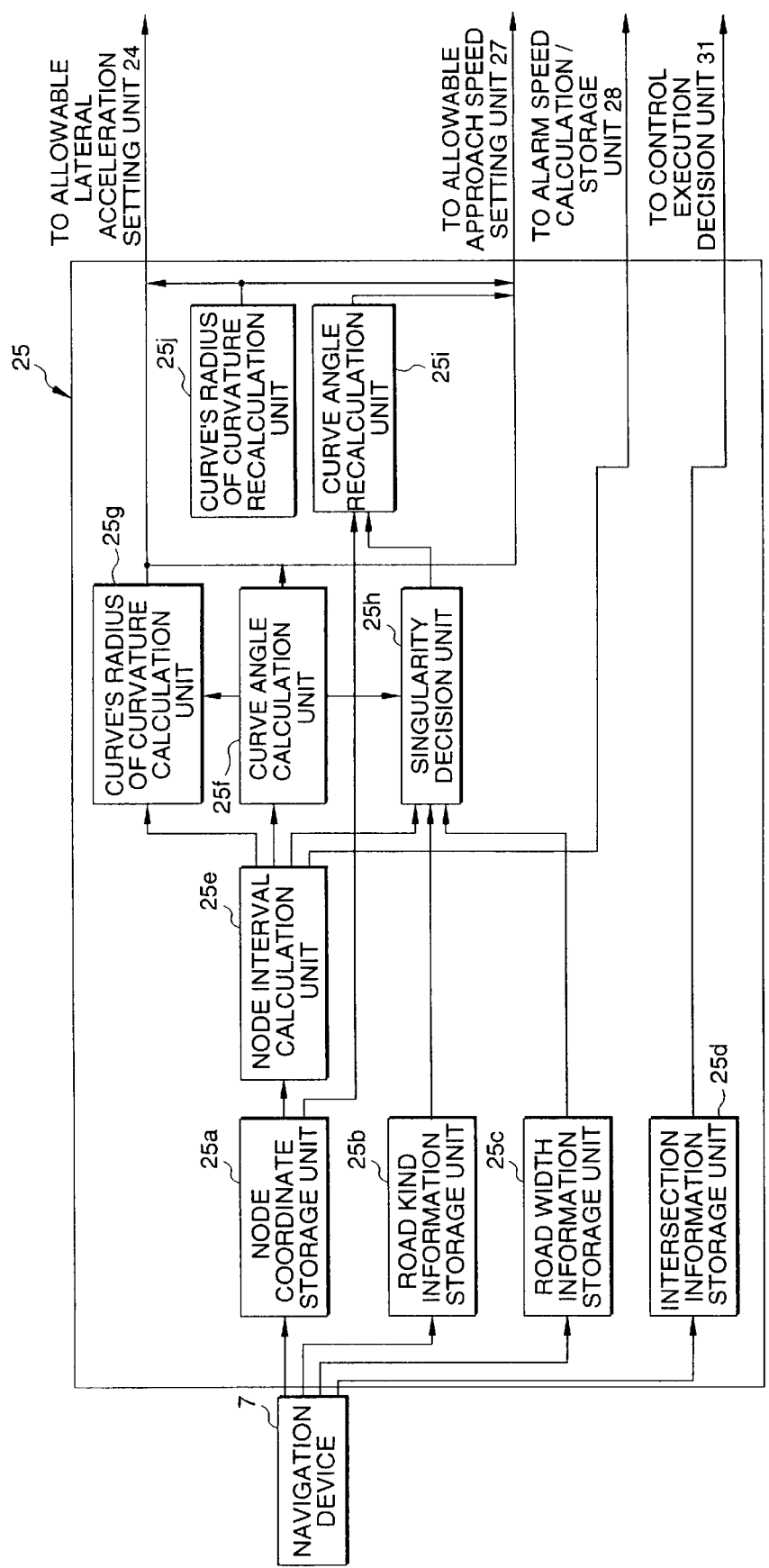
FIG. 2 is a function block diagram of the front road attribute calculation/storage unit.

In more concrete terms, as shown in FIG. 2, the front road attribute calculation/storage unit 25 has a node coordinate storage unit 25a, a road kind information storage unit 25b, a road width information storage unit 25c, an intersection information storage unit 25d, a node interval calculation unit 25e, a curve angle calculation unit 25f, a curve's radius of curvature calculation unit 25g, a singularity decision unit 25h, a curve angle recalculation unit 25i, and a curve's radius of curvature recalculation unit 25j.

The storage units 25a–25d store road information, with its own car position as a reference, which is output from the navigation device 7 while running. That is, the node coordinate storage unit 25a stores a coordinate Pj representing the position of each node, and the road kind information storage unit 25b stores a road kind attribute cp[j] of each node. The road kind attribute cp[j] refers to a kind of road, such as highway or ordinary road, and is set as shown in a table below.

| | |
|---|---|
| Expressway | 5 |
| City expressway | 4 |
| General highway | 3 |
| Main local road | 2 |
| Other road | 1 |

The road width information storage unit 25c, according to the road width flag issued from the navigation device 7, sets the road width attributes wp[j] of the roads that the car is going to travel, and stores the attributes. The road width attribute wp[j] for each node is, for example, set as shown in a table below to represent the actual road width of the flag output from the navigation device 7.

| Road width range indicated by flag | Road width attribute |
|---|---|
| 3 m or less | 3 m |
| 3–5.5 m | 5 m |
| 5.5–13 m | 10 m |
| 13 m or more | 15 m |

The intersection information storage unit 25d uses the intersection flag information output from the navigation device 7 to set and store the intersection attribute ip[j]. The intersection flag information is set as shown in a table below.

| | |
|---|---|
| Other than intersection | 0 |
| Intersection | 1 |
| Intersection on guided path | 2 |

The intersection on a guided path refers to an intersection on a guided path used when a destination is set in the navigation device 7.

Figure 16:
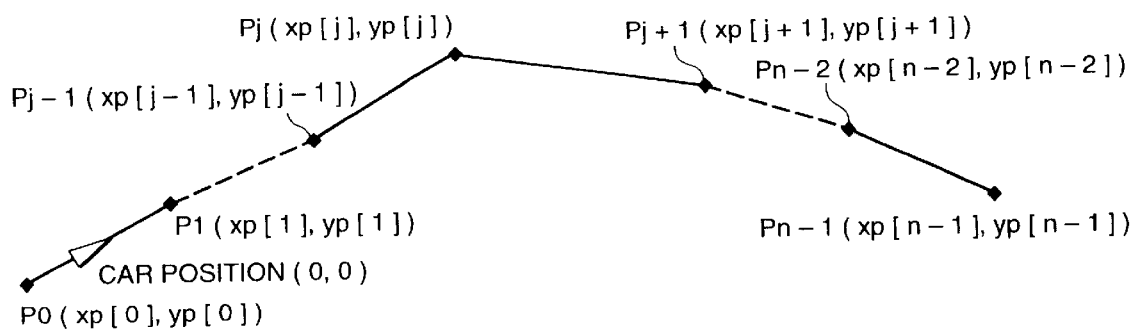
FIG. 16 is an explanatory diagram showing node coordinates with a car position as a reference.

The node interval calculation unit 25e calculates an interval (node interval) Lp[j] between the node coordinate Pj stored in the node coordinate storage unit 25a and a node Pj−1 immediately preceding it. That is, as shown in FIG. 16, the node interval calculation unit 25e calculates a node interval Lp[j] between the node Pj and the adjacent node Pj−1 from the following formula based on the node coordinates P0 (xp[0], yp[0]), P1 (xp[1], yp[1]), ... Pj−1(xp[j−1], yp[j−1]), Pj(xp[j], yp[j]), ... Pn−1 (xp[n−1], yp[n−1]).

$$Lp[j]=\{(xp[j]-xp[j-1])^2+(yp[j]-yp[j-1])^2\}^{1/2}$$

where $1 \leq j \leq n-1$.

The curve angle calculation unit 25f calculates a node angle tp[j] at the node Pj (see FIG. 17) from the following formula.

$$tp[j]=\sin^{-1}[\{(xp[j-1]-xp[j])\cdot(yp[j]-yp[j+1])-(xp[j]-xp[j+1])\cdot(yp[j-1]-yp[j])\}/(Lp[j]\cdot Lp[j+1])]$$

The node angle tp[j] obtained here is represented as a positive value for the right curve and a negative value for the left curve.

Figure 17:
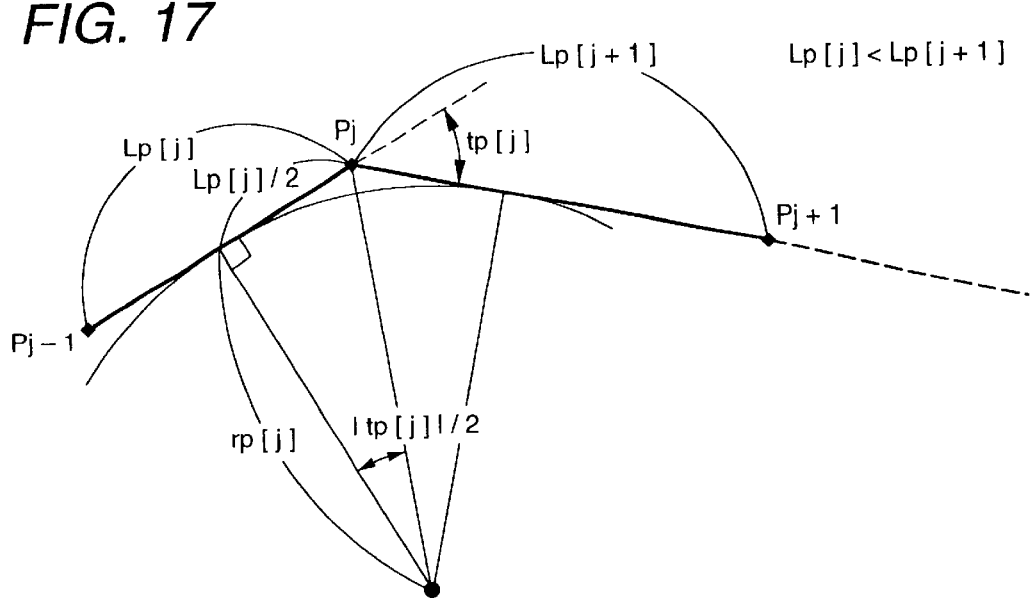
FIG. 17 is an explanatory diagram showing a method of calculating a curve's radius of curvature.

The curve's radius of curvature calculation unit 25g calculates a curve's radius of curvature rp[j] at the node Pj from the following formula based on the node interval Lp[j], Lp[j+1] and the node angle tp[j].

$$rp[j]=\min (Lp[j], Lp[j+1])/2/\tan(|tp[j]|/2)$$

where min (Lp[j], Lp[j+1]) means a selection of whichever node interval is shorter. In FIG. 17 because Lp[j]<Lp[j+1], the above formula can be rewritten as $$rp[j]=Lp[j]/2/\tan(|rp[j]|/2)$$

The singularity decision unit 25h sets whether each node is a singularity point. The singularity point is represented by a flag value of 0–4 and is defined as follows.

1) Singularity point 0

This value indicates that there is no anomaly. The initial value of the singularity point flag of all nodes is 0.

2) Singularity point 1

This value disables alarm and deceleration control for the associated node.

3) Singularity point 2

This value is set for a near side node of two adjacent nodes with a short node interval and is removed when calculating the curve's radius of curvature.

4) Singularity point 3

This value is set for a far side node of two adjacent nodes with a short node interval and is removed when calculating the curve's radius of curvature.

5) Singularity point 4

This value is set for a node which is identified as both the singularity point 2 and the singularity point 3 and is removed when calculating the curve's radius of curvature.

Therefore, when the singularity point is other than 0, the node is removed when calculating the curve's radius of curvature.

The nodes stored in a CD-ROM of the navigation device 7 represent the shape of a road but does not necessarily trace the center line of the road precisely. Generally, as shown in FIGS. 9 to 15 at node b or c, they are plotted within the width of the road with some variations.

When the adjacent nodes are abnormally close and if the curve's radius of curvature is calculated based on this narrow node interval, the calculated radius of curvature will be too small compared with the actual road curve's radius of curvature, with the result that an alarm or deceleration control may be activated too sensitively when in reality the curve has a moderate curvature. Hence, when the curve's radius of curvature is calculated, such nodes are removed from the calculation as singularities or the result of calculation is rendered invalid thereby preventing too sensitive an alarm or deceleration from being activated.

A basic concept for setting singularities in this invention is that when the node interval between the adjacent nodes is less than a preset interval, one or both of the adjacent nodes are removed from the calculation of the curve's radius of curvature.

In addition to this basic concept, the following operations should preferably be performed. That is, the node angles at the adjacent nodes are compared in absolute value and, when the absolute value of the large node angle is equal to or more than a predetermined threshold value or when the absolute value of the smaller node angle is equal to or less than a predetermined threshold value, the one or both of the nodes are removed from the calculation of the curve's radius of curvature.

Figure 10:
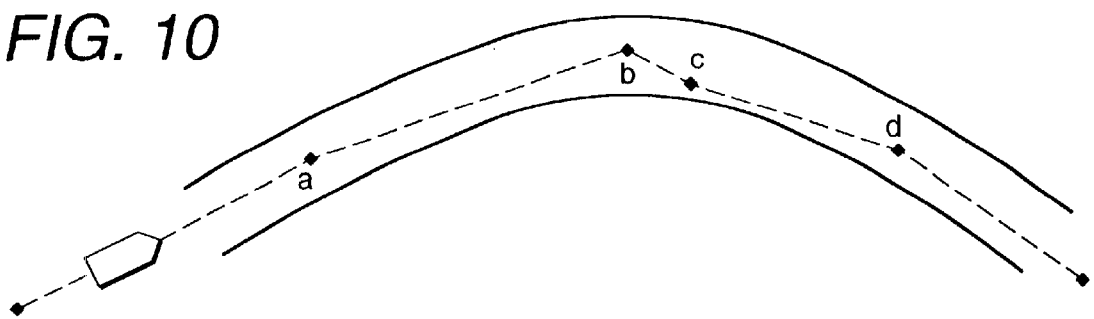
FIG. 10 is an explanatory diagram showing an example in which a singularity node exists on a curve.
Figure 12:
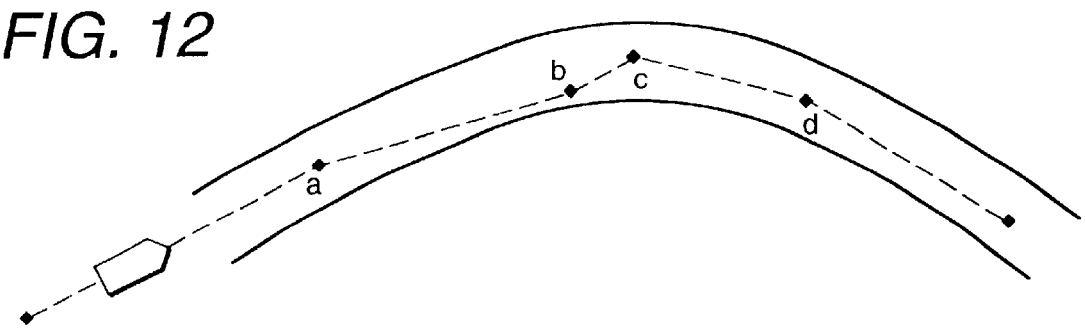
FIG. 12 is an explanatory diagram showing a further example in which a singularity node exists on a curve.

Further, in addition to the basic concept of the present invention, when the bending directions of the node angles at the adjacent nodes are opposite, it is preferred that one or both of the nodes be removed from the calculation of the curve's radius of curvature. It is further preferred that when the absolute value of the larger one of the node angles at the adjacent nodes is larger than a predetermined threshold value or when the absolute value of the smaller node angle is smaller than a predetermined threshold value, one or both of the nodes be removed from the calculation of the curve's radius of curvature. FIGS. 10 and 12 correspond to these cases.

Figure 11:
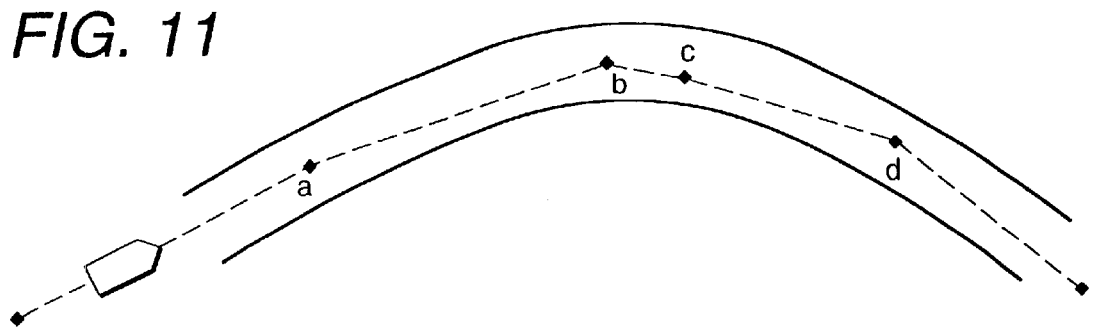
FIG. 11 is an explanatory diagram showing another example in which a singularity node exists on a curve.
Figure 13:
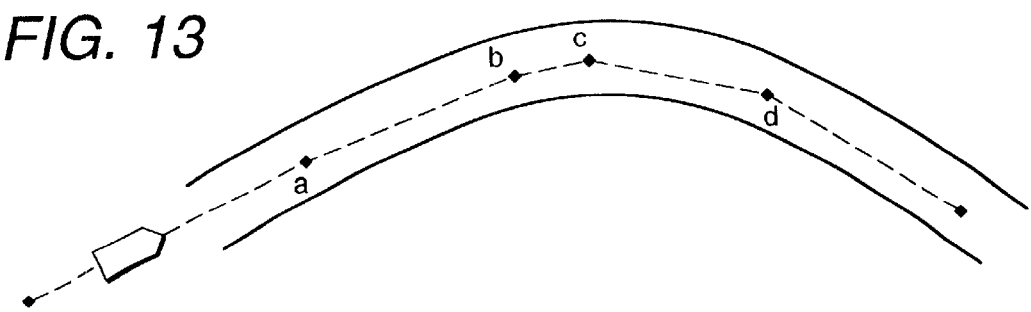
FIG. 13 is an explanatory diagram showing a further example in which a singularity node exists on a curve.

In addition to the above basic concept of the present invention, it possible to remove one or both of the nodes from the calculation of the curve's radius of curvature when the bending directions of the node angles at the adjacent nodes are the same. In that case, when the absolute value of the larger one of the node angles at the adjacent nodes is larger than a predetermined threshold value, it is further preferred that one or both of the nodes be removed from the calculation of the curve's radius of curvature. FIGS. 11 and 13 correspond to these cases.

Figure 9:
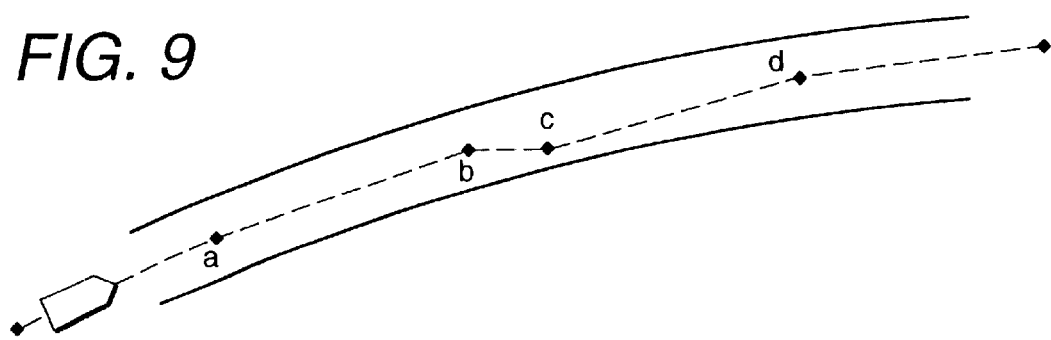
FIG. 9 is an explanatory diagram showing a singularity point among nodes on an almost straight road.

In addition to the above basic concept of the present invention, the following step may be taken. In the four consecutive nodes, when the angle formed by a line segment connecting the first two nodes and a line segment connecting the last two nodes is equal to or less than a predetermined threshold value and the line segments are almost parallel, one or both of the intermediate two nodes may be removed from the calculation of the curve's radius of curvature. FIG. 9 corresponds to this case.

One example of the setting of a singularity flag for each node as executed by the singularity decision unit 25h will be explained by referring to the flow chart shown in FIG. 4 to FIG. 8.

FIGS. 4 to 7 show a singularity decision routine. Each node will be explained according to the reference number shown in FIGS. 9 to 15 and the decision on the singularity is performed for all nodes. In this routine, the node c is taken as a node to be checked for the singularity for the sake of convenience. The initial value of the singularity flag for each node is set to 0.

In the flow charts shown in FIGS. 4 to 7, step S1 compares a set node interval wk with a node interval Lp[c] between the node c to be checked for the singularity decision and the preceding node b.

The set node interval wk as a threshold value to be compared with the node interval Lp[c] is the road width attribute wp[c] multiplied by a set node interval calculation coefficient wk1. A different set node interval calculation coefficient wk1 is set for each road kind attribute cp[j]. This is to make the singularity easier to set to prevent a sharp curve's radius of curvature from being calculated because the larger the road, the less frequent it will be to encounter a sharp curve.

When Lp[c]≧wk, the node interval Lp[c] is longer than the set node interval wk, so that the routine is exited. When Lp[c]<wk, i.e., the interval is short, the routine moves to step S2 where a comparison is made between a minimum threshold angle tk1 and an angle (|tp[b]+tp[c]|) formed by a line connecting the nodes a and b (vector ab) and a line connecting the nodes c and d (vector cd).

The minimum threshold angle tk1 for the angle between the vector ab and the vector cd is obtained by multiplying a reference angle tk0 (for example 6°) by a ratio of the set node interval wk to the node interval Lp[c] of the node c, which is to be checked for singularity (tk1=tk0·wk/Lp[c]). This is to make it more likely that the small node interval Lp[c] will be identified as a singularity point because the smaller the node interval Lp[c], the more likely the calculated value of curve's radius of curvature rp[c] will be set to an abnormally small value.

When |tp[b]+tp[c]|<tk1, the routine moves to step S3 where it multiplies the node angles tp[b] and tp[c] and checks whether the multiplied result is positive or negative. When it is positive value (tp[b]·tp[c]>0), the nodes tp[b], tp[c] are bent in the same directions, so that the routine is exited. When on the other hand it is a negative value (tp[b]·tp[c]<0), the vector ab and vector cd bend like a crank with the vector bc in between, so that the routine proceeds to step S4 where it sets one or both of the singularity flags of the nodes b, c to 2 or 3 before being aborted.

That is, when nodes a, b, c, d are arranged in a crank shape and the directions of the vector ab and the vector cd are almost equal, there is a possibility that calculating the curve's radius of curvature for the node b or c may result in an extremely small curve's radius of curvature much smaller than the actual geometry of the curve. Hence, the singularity flag of at least one of the nodes b, c is set to 2 or 3 to remove the node from the calculation of the curve's radius of curvature.

When it is decided at step S2 that |tp[b]+tp[c]|≧tk1 and the program branches to step S5, it is checked whether the multiplied value of the node angles tp[b], tp[c] is positive, as in step S3. If the multiplied result is positive or negative (tp[b]·tp[c]>0), the bending directions of the road at nodes b and node c are the same, so that the program branches to step S15. If it is negative (tp[b]·tp[c]<0), the bending directions are opposite and the program moves to step S6.

Step S6 compares the absolute value of the node angle tp[b] of near-side node b with the absolute value of the node angle tp[c] of the node c, which is to be checked for singularity. When the absolute value of the node angle tp[b] is larger than the absolute value of the node angle tp[c] (|tp[b]|>|tp[c]|), the program moves to step S7. When the absolute value of the near-side node angle tp[b] is smaller than the absolute value of the node angle tp[c] (|tp[b]|≦|tp[c]|), the program branches to step S18.

At step S7, the program compares the absolute value of the larger node angle tp[b] with the maximum threshold angle tk2. The maximum threshold angle tk2 is determined by multiplying the reference angle tk0 (e.g., 6°) by a ratio of the node interval Lp[c] of the node c, which is to be checked for singularity, to the set node interval wk (tk2=tk0·Lp[c]/wk).

This is intended to make it more likely that the small node interval Lp[c] will be identified as a singularity point because the smaller the node interval Lp[c], the more likely the calculated value of curve's radius of curvature rp[c] will be set to an abnormally small value.

When at step S7 it is decided that |tp[b]|≧tk2, the program moves to step S8. When |tp[b]|<tk2, the routine is exited. At step S8, the absolute value of the smaller node angle tp[c] and the minimum threshold angle tk1 are compared. Then, when |tp[c]|≦tk1, the routine moves to step S9, where it sets the singularity flag of the node c, which is to be checked for singularity, to 3 before moving to step 10. When |tp[c]|>tk1, the routine is aborted.

This case corresponds to a node arrangement such as shown in FIG. 10. That is, the node b which will likely trigger an alarm or deceleration control is followed closely by a node c on the curve, with a relatively large positional variation between the node b and the node c. At around the node c, the road is bent like a concave in a direction opposite the curve although the node c does not deviate out of the width of the actual road. This part constitutes a curve shape that cannot exist in reality. Further, because the node interval Lp[c] is very short, there is a possibility that calculating the curve's radius of curvature at the node b may result in a very small curve's radius of curvature far smaller than the actual curve geometry. Therefore, the singularity flag of the node c is set to 3 to remove the node c from the calculation of the curve's radius of curvature.

Then the program moves to step S10. At steps S10 and subsequent steps the program removes the node c, which has its singularity set at 3, and then checks the singularity of the adjacent node d.

First, at step S10 the node c is eliminated and the node interval Lp[d], the node angles tp[b], tp[d] and others associated with the nodes b and d are calculated again.

Steps S11–S13 check whether the node d is a singularity point or not. That is, step S11 compares the node interval Lp[d] and the set node interval wk, and step S12 multiplies the node angles tp[b] and tp[d] and checks whether the multiplied value is positive or negative. Then step S13 compares the absolute value of the node angle tp[b] with the minimum threshold angle tk1.

When Lp[d]<wk, tp[b]·tp[d]>0 and |tp[b]|≦tk1, the routine moves to step S14 where it sets the singularity flag of the node d to 1 before being exited.

When Lp[d]≧wk, tp[b]·tp[d]<0 and |tp[b]|>tk1, the routine is exited.

Figure 14:
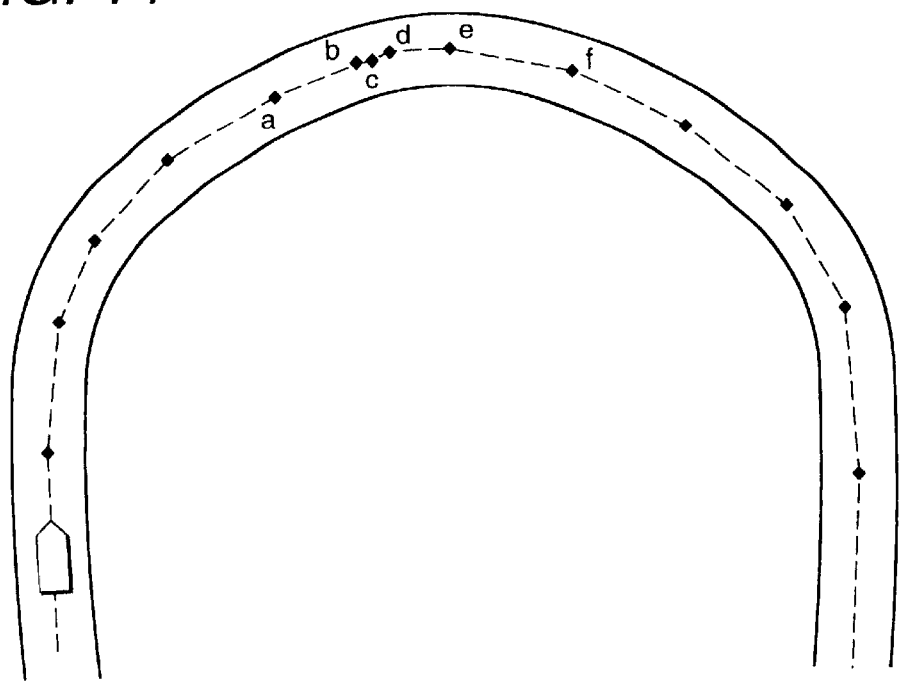
FIG. 14 is an explanatory diagram showing a further example in which a singularity node exists on a curve.

That is, as shown in FIG. 14, when the node c is identified as a removal point for the curve's radius of curvature calculation because the singularity flag of the node c is set to 3, the node c is removed and the curve's radius of curvature rp[d] and the node angle tp[d] at the node d are calculated based on information stored in the nodes b, d, e. If the node interval Lp[d] at the node d is short and the road before and after the node b is almost linear, different from the actual curve shape, the calculated curve's radius of curvature at the node d cannot be said to represent the actual curve geometry and is highly likely to assume significantly small value. This possibility is particularly high with expressways and general roads with a large width.

In such a case, the alarm and deceleration control based on the node d is too sensitive and makes the driver feel incongruous. When the recalculation is made by eliminating the node d, the node interval will be too large, giving rise to a possibility that the calculated curve's radius of curvature may be close to a straight line, different from the actual curve geometry. Hence, the singularity flag of the node d is set to 1 to invalidate the calculated curve's radius of curvature and node angle, allowing the car to move on without initiating the alarm and deceleration control.

Figure 4:
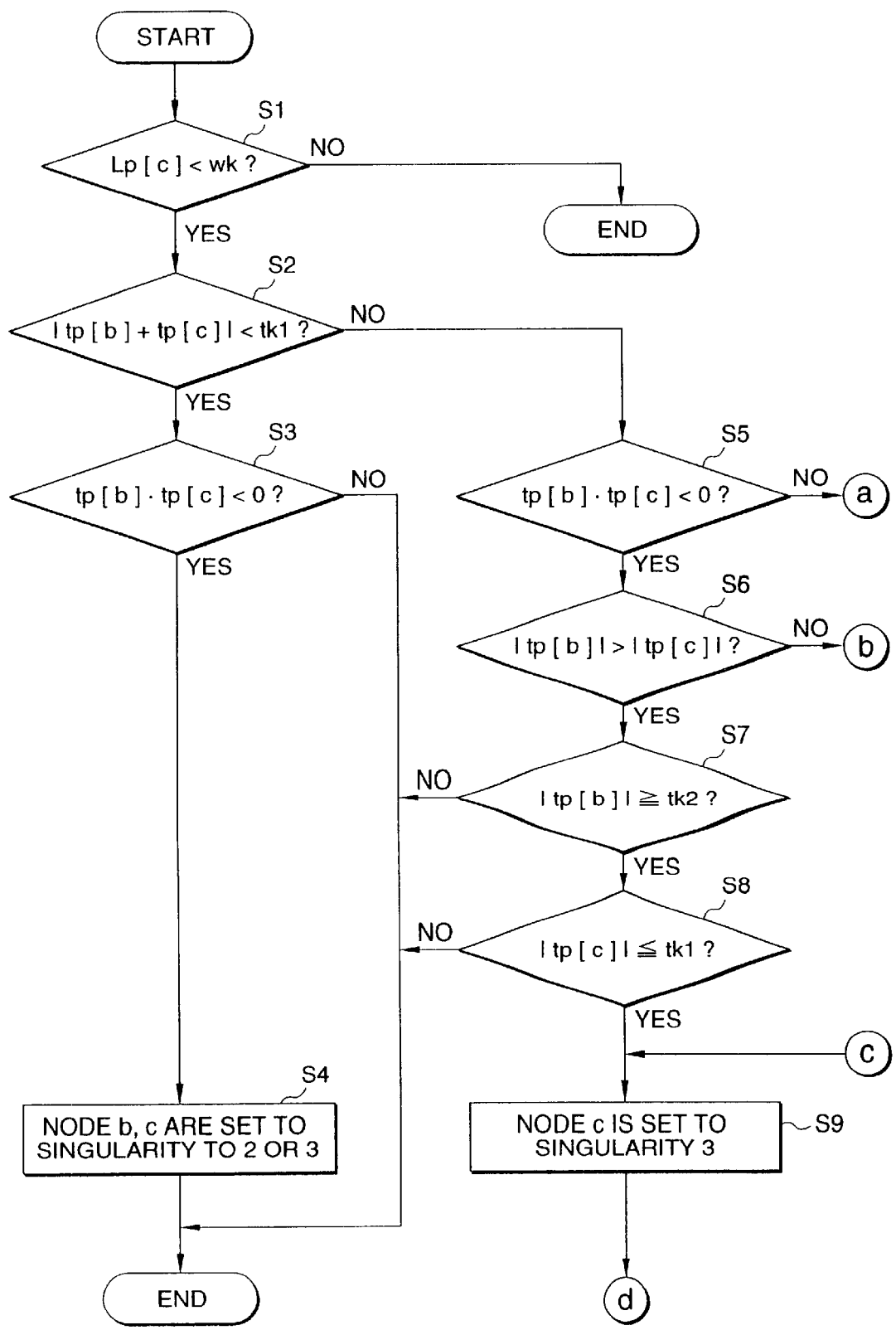
FIG. 4 is a flow chart showing a singularity point decision routine.
Figure 5:
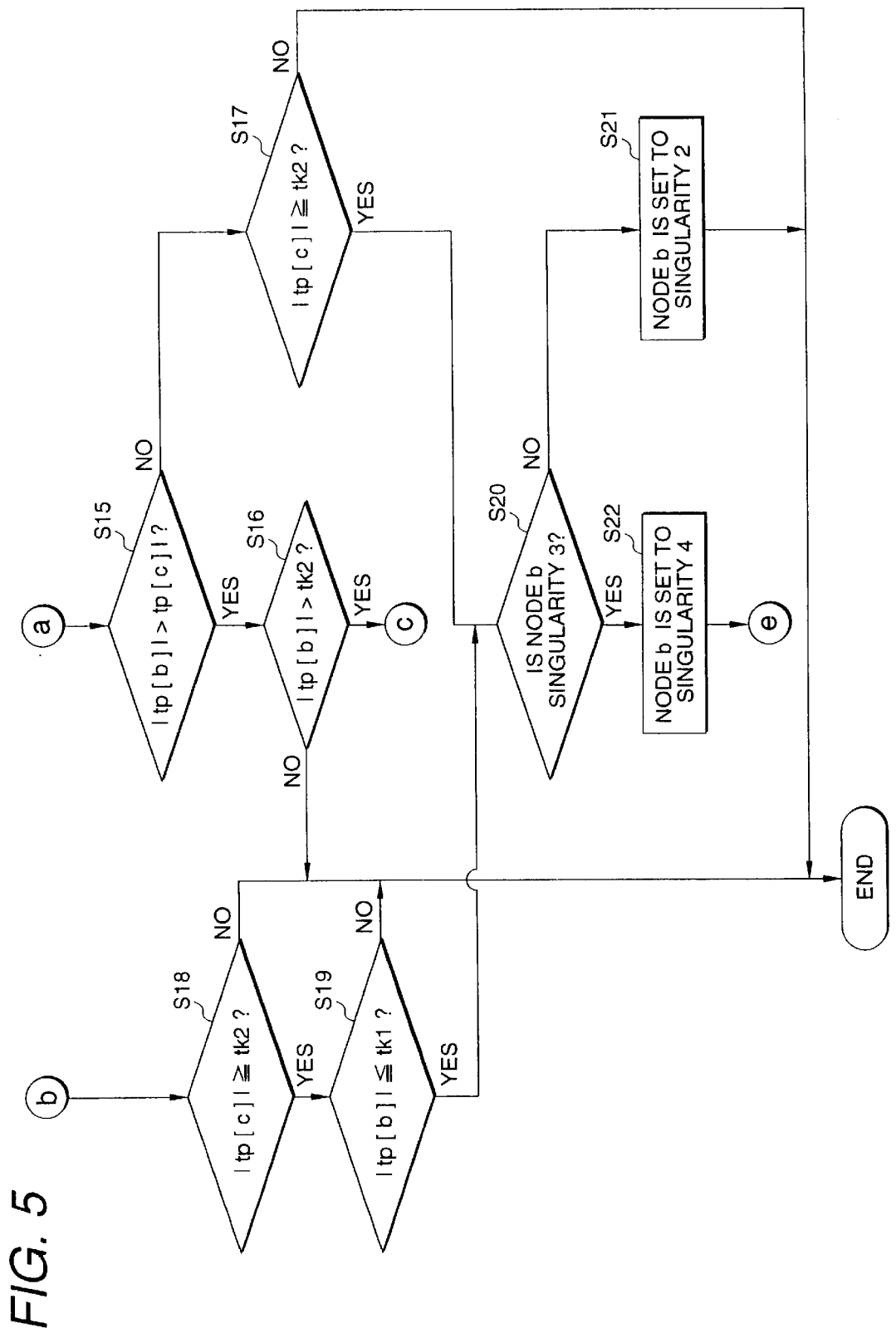
FIG. 5 is a flow chart showing a singularity point decision routine (continued)
Figure 6:
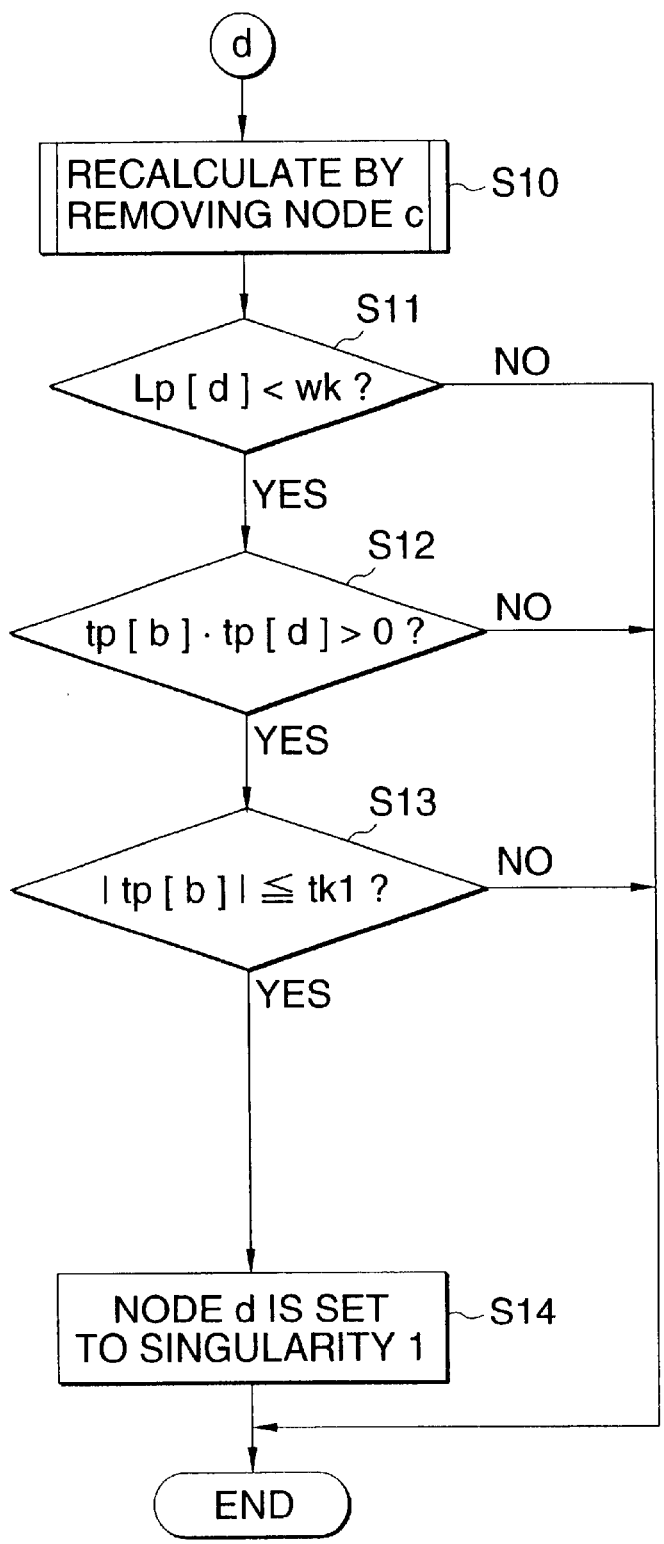
FIG. 6 is a flow chart showing a singularity point decision routine (continued)

When the program branches from step S5 of FIG. 4 to step S15 of FIG. 5, it compares the absolute value of the node angle tp[b] of the near-side node b with the absolute value of the node angle tp[c] of the node c, which is to be checked for singularity. When the absolute value of the near-side node angle tp[b] is larger than the absolute value of the node angle tp[c] (|tp[b]|>|tp[c]|), the program moves to step S16. When the absolute value of the near-side node angle tp[b] is smaller than the absolute value of the node angle tp[c] (|tp[b]|≦|tp[c]|), the program branches to step S17.

Step S16 compares the absolute value of the larger node angle tp[b] with the maximum threshold angle tk2. When |tp[b]|>tk2, the program proceeds to step S9 of FIG. 4. When |tp[b]|≦tk2, the routine is exited.

In FIG. 11, the node c is close to the preceding node b, the road bending direction at the node b and the road bending direction at the node c are the same, and the node angle tp[c] at the node c is very small. Although the node c does not deviate from the actual road width, the road before and after the node c is close to a straight line, different from the actual curve geometry. Further, because the node interval Lp[c] is very short, there is a possibility that calculating the curve's radius of curvature at the node b may result in a very small curve's radius of curvature far smaller than the actual curve geometry. Because the node angle tp[c] at the node c is small and the node c is not necessary in representing the curve geometry, the singularity flag of the node c is set to 3 to eliminate the node from the calculation of the curve's radius of curvature.

After branching from step S15 to step S17, the program compares the absolute value of the larger node angle tp[c] with the maximum threshold angle tk2. When |tp[c]|≧tk2, the program moves to step S20. When |tp[c]|<tk2, the program exits the routine.

After moving from step S17 to step S20, the program checks whether the singularity flag of the node b is set to 3. If the singularity flag is found set to other than 3, the program moves to step S21 where it sets the singularity flag of the node b to 2 before exiting the routine. When the singularity flag of the node b is found set to 3, the program moves to step S22 where it sets the singularity flag of the node b to 4.

That is, when, as shown in FIG. 12, the node b on a curve has a large positional variation with respect to the subsequent node c, which is to be checked for singularity, the road near the node b is locally bent like a concave in a direction opposite to the actual curve, resulting in a curve geometry that cannot exist in reality, although the node b is not deviated from the actual road width. Because the node interval Lp[c] is very short, there is a possibility that calculating the curve's radius of curvature at the node c may result in an extremely small curve's radius of curvature much smaller than the actual road curve geometry. Hence, the near-side node b is removed from the calculation of the curve's radius of curvature.

After branching from step S6 of FIG. 4 to step S18 of FIG. 5, the program compares the absolute value of the larger node angle tp[c] with the maximum threshold angle tk2. When |tp[c]|≧tk2, the program moves to step S19 and, when |tp[c]|<tk2, exits the routine.

Step S19 compares the absolute value of the smaller node angle tp[b] with the minimum threshold angle tk1. When |tp[b]|≦tk1, the program moves to step S20 and, when |tp[b]|>tk1, exits the routine.

Step S20 checks whether the singularity flag of the node b is set to 3. Depending on the check result, the singularity flag of the node b is set to either 2 or 4 at step S21 or step S22.

That is, as shown in FIG. 13, when the near-side node b is located very close to the next node c, which is to be checked for singularity, and the node angle tp[b] of the node b is very small, the road before and after the node b is linear, different from the actual curve geometry although the node b is not deviated from the actual road width. Because the node b and node c are very close to each other, calculating the curve's radius of curvature at the node c may result in a curve's radius of curvature much smaller than the actual road curve geometry. Hence, because the node angle at the node b is small and thus the node b is not necessary in representing the curve geometry, the node b is eliminated from the calculation of the curve's radius of curvature.

Figure 7:
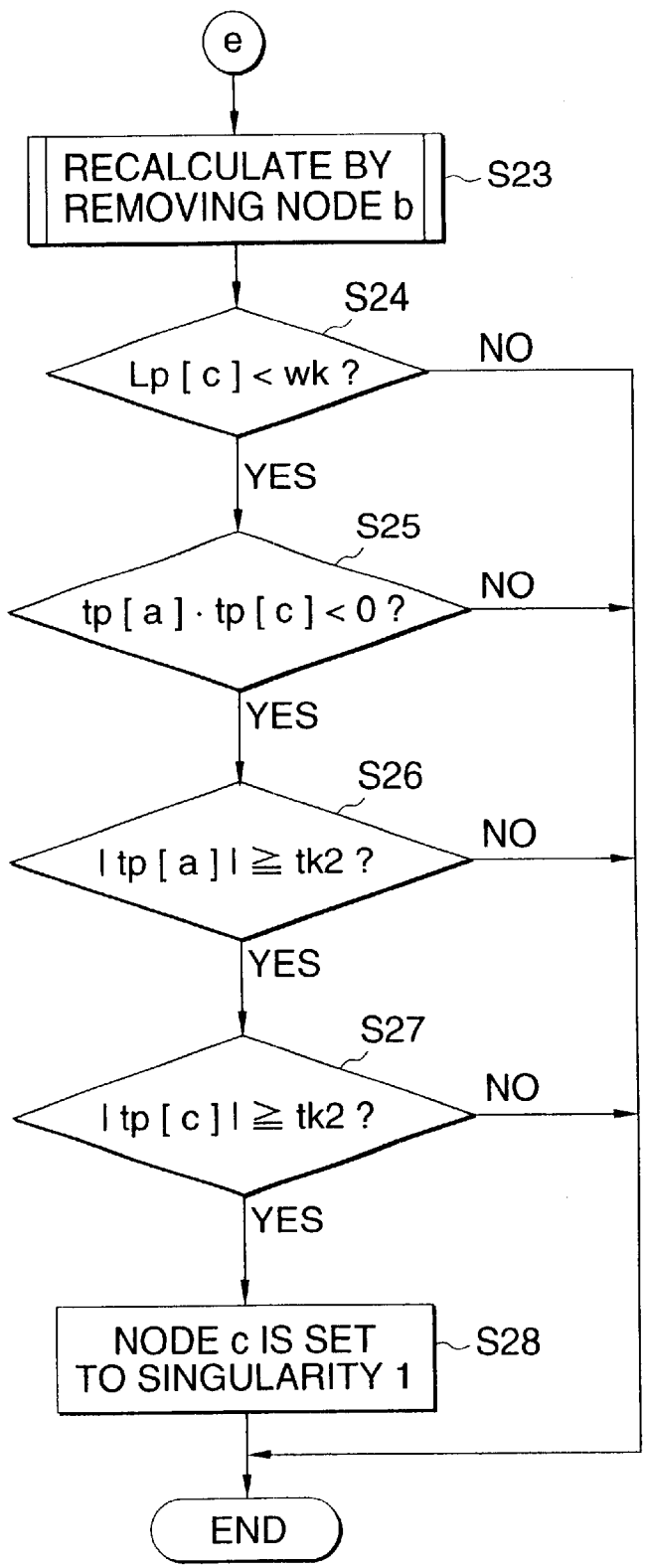
FIG. 7 is a flow chart showing a singularity point decision routine (continued)

Further, after proceeding from step S22 to step S23 of FIG. 7, the program at step S23 and subsequent steps removes the node b whose singularity flag is set to 4 and then makes a singularity decision on the node c.

That is, step S24 compares the node interval Lp[c] and the set node interval wk; step S25 multiplies the node angles tp[a], tp[c] and checks whether the multiplied value is positive or negative; step S26 compares the absolute value of the node angle tp[a] with the maximum threshold angle tk2; and step S27 compares the absolute value of the node angle tp[c] with the maximum threshold angle tk2.

Then, when Lp[c]<wk, tp[a]·tp[c]<0, |tp[a]|≧tk2 and |tp[c]|≧tk2, the program moves to step S28 where it sets the singularity flag to 1 before exiting the routine.

When Lp[d]≧wk, tp[b]·tp[d]>0, |tp[a]|<tk2 or |tp[c]|<tk2, the program exits the routine.

Figure 15:
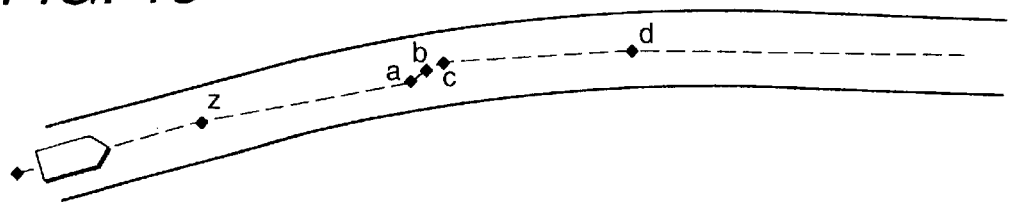
FIG. 15 is an explanatory diagram showing a further example in which a singularity node exists on a curve.

That is, in this case, as shown in FIG. 15, the nodes a, b and c are located close to each other on a nearly straight road. Even when the node b preceding the node c is eliminated in the recalculation procedure, if the node interval Lp[c] which represents a distance between the nodes a and c is still small, the sequence of nodes z, a, c, d constitute an inappropriate local crank shape although the road is almost straight. Hence, the singularity of the node c is set to 1 to invalidate the calculated curve's radius of curvature and node angle and allows the car to move on without activating an alarm or deceleration control.

The processing described above is successively executed for all nodes to check their singularity. When the processing has been completed for all nodes, the singularity information thus checked is output from the singularity decision unit 25h to the curve angle recalculation unit 25i and the curve's radius of curvature recalculation unit 25j. These recalculation units 25i, 25j calculate again the curve angle and the curve's radius of curvature for each node excluding the node which is determined as the singularity point based on the singularity information.

Figure 8:
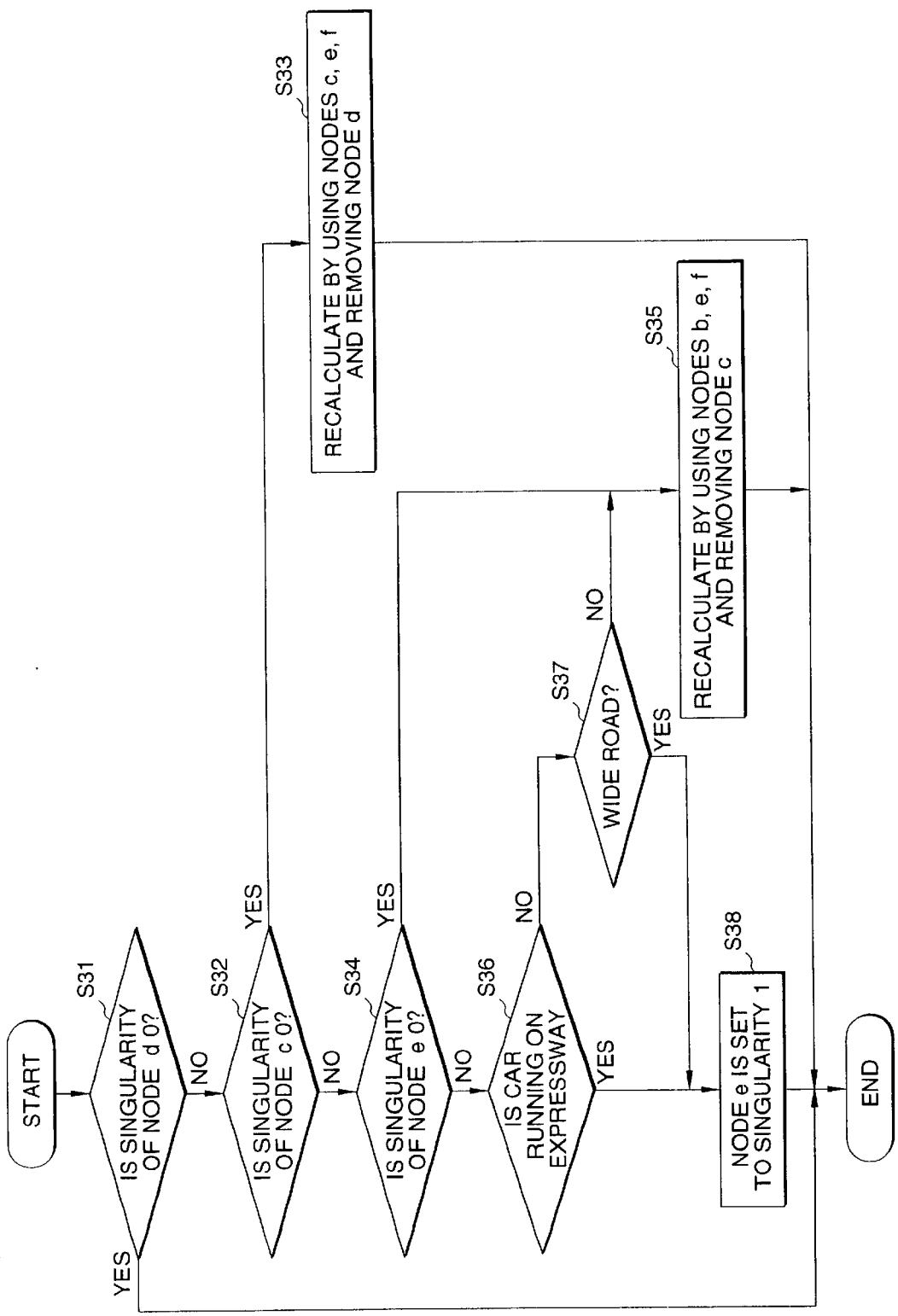
FIG. 8 is a flow chart showing a recalculation routine.

The recalculation routine executed by these recalculation units 25i, 25j is performed according to the flow chart of FIG. 8. This routine will be explained by taking, as an example node to be processed, the node e from among a series of nodes a, b, c, d, e, f consecutively arranged in the order of travel First, step S31 checks the value of the singularity flag of the node d preceding the node e, which is to be processed. When the value is 0, this means there is no anomaly with the node and thus the program exits the routine. When the value is other than 0, the program moves to step S32 where it checks the value of the singularity flag of the node c preceding the node d.

Then, when the singularity flag of the node c is 0, the program branches to step S33 where it eliminates the node d and uses three nodes c, e, f to recalculate the node angle tp[e] and the curve's radius of curvature rp[e] of the node e before exiting the routine.

When at step S32 the singularity flag of the node c is found to be other than 0, the next step S34 checks the singularity flag of the node e, which is to be processed. When it is 0, which means there is no anomaly, the program branches to step S35. When the singularity flag is set with other than 0, the program moves to step S36.

At step S35 the program removes the nodes c and d and uses the nodes b, e, f to recalculate the node angle tp[e] and the curve's radius of curvature rp[e] of the node e before existing the routine.

At step S36, the program reads the road kind attribute cp[e] of the node e and checks whether the road on which the car is running is an expressway or general road. When it is an expressway (cp[e]=5), the program moves to step S38 and, when it is a general road (cp[e]=3), moves to step S37.

At step S37, the program reads the road width attribute wp[e] of the node e and checks whether the road is a wide road (e.g., wp[e]=15). If the road is found to be a wide road, the program moves to step S38 and, when it is other than the wide road, moves to step S35 and recalculates the node angle tp[e] and the curve's radius of curvature rp[e].

After moving from step S36 or S37 to step S38, the program sets the singularity flag of the node c to 1 before exiting the routine.

That is, in the recalculation units 25i, 25j, the node angle is calculated for a node immediately following the node judged as a singularity point (a node to be removed from the curve's radius of curvature calculation) by the singularity decision unit 25h and the curve's radius of curvature is calculated for a node immediately preceding the node judged as the singularity point.

In this case, when the node d is judged as the singularity point (a node to be removed from the curve's radius of curvature calculation) for example, the nodes c, e, f are used to calculate the curve angle and the curve's radius of curvature (step S33). If the node c too is judged as the singularity point (a node to be removed from the curve's radius of curvature calculation), the curve angle and the curve's radius of curvature at the node e are recalculated by using the node b, e, f (step S35).

Further, if the node e too is judged as the singularity point (a node to be removed from the curve's radius of curvature calculation), when the road currently traveled is an expressway or a wide road (for example, more than 15 m), the node e is judged to be a node for which the curve's radius of curvature cannot be calculated (the singularity flag is set to 1), with the result that the node e itself is removed from the alarm and deceleration control and no recalculation is performed (step S38). When the car is traveling on a general road with not so large a width, the nodes b, e, f are used to calculate the curve angle and the curve's radius of curvature (step S35).

That is, the expressway and general road with a large width normally do not have a sharp or complicated curve and thus there is no need to calculate a curve's radius of curvature which is smaller than the actual road geometry. In a narrow general road, however, there can be complex and sharp curves depending on locations and it is therefore considered safer to calculate a curve's radius of curvature so that it can be used for the possible alarm and deceleration control even if it is somewhat smaller than the actual road geometry.

The node angle and the curve's radius of curvature calculated by the curve angle recalculation unit 25i and the curve's radius of curvature recalculation unit 25j are output to an allowable lateral acceleration setting unit 26 and an allowable approach speed setting unit 27.

The allowable lateral acceleration setting unit 26 calculates a reference value ayl1 of the allowable lateral acceleration ayl according to the road surface friction coefficient $\mu$, corrects the reference value ayl1 by the road gradient SL, sets an allowable lateral acceleration ayl2, corrects the allowable lateral acceleration ayl2 according to the curve approach limit speed $((ayl1/rp[j])1/2)$, and sets a final allowable lateral acceleration ayl.

The reference value ayl1 is disclosed in JP-A-11-83501 already filed by this applicant and can be determined from the following equation.

$$ayl1 = \mu \cdot K\mu \cdot g$$

where $K\mu$ is a safety coefficient and g is a gravity acceleration.

The allowable lateral acceleration ayl2 can be determined, for example, from the following equation.

$$ayl2 = (ayl1^2 - (g \cdot SL/100)^2)1/2$$

Further, the final allowable lateral acceleration ayl can be calculated, for example, from the following equation.

$$ayl = ayl2 \cdot Kv$$

where Kv is a car speed correction coefficient which is set so that it becomes smaller as the curve approach limit speed increases. That is, to enhance the safety during the high-speed cornering, the allowable lateral acceleration ayl at a curve is corrected to decrease as the curve approach limit speed increases.

The allowable lateral acceleration ayl is read into the allowable approach speed setting unit 27. The allowable approach speed setting unit 27 first calculates a reference value vap0 of the allowable approach speed for the node Pj from the following equation based on the allowable lateral acceleration ayl and the curve's radius of curvature rp[j] stored in the front road attribute calculation/storage unit 25.

$$vap0 = (ayl \cdot |rp[j]|)1/2$$

Next, the node angles of the nodes belonging to the same curve are added up successively to calculate a curve depth (opening angle) tpa at each node. As shown in FIG. 17, the curve depth tpa when the curve consists of one node Pj is given by $$tpa = tp[j]$$

Then, based on the curve depth tpa, the reference value vap0 is corrected to determine the allowable approach speed vap1 from the following equation, for example.

$$vap1 = vap0 \cdot Kt$$

where Kt is a curve depth correction coefficient determined by the curve depth tpa and is so set that it decreases as the curve depth tpa increases. This is intended to make corrections so as to reduce the allowable approach speed at the curve as the curve depth tpa increases because at a large curve depth tpa the cornering becomes difficult.

When the curve is tight, with the nodes having the curve's radius of curvature rp[j] equal to or less than a predetermined percentage rwk of the road width wp [j], the allowable approach speed vap1 is further corrected to determine an allowable approach speed vap2 in order to prevent the allowable approach speed from becoming extremely small.

The allowable approach speed vap2 is set by comparing a predetermined value based on the road width $(ayl \cdot wk \cdot rwk) 1/2$ and the allowable approach speed vap1 and selecting the larger one. That is, the allowable approach speed vap2 is determined by $$vap2 = \max (vap1, (ayl \cdot wk \cdot rwk)1/2)$$

Then, the allowable approach speeds vap2 of the nodes making up the same curve are smoothed out to adjust their variations and thereby set a final allowable approach speed vap.

In more concrete terms, a comparison is made among the following three approach speed: the allowable approach speed vap2[j] at the node Pj, which is one of the nodes making up the same curve; an average value of the vap2[j] and an allowable approach speed vap2[j+1] at the next node Pj+1; and an average value of the allowable approach speed vap2[j] and an allowable approach speed vap2 [j−1] at the preceding node Pj−1. A median value of the three is set as a final allowable approach speed vap for the node Pj.

The smoothing processing for a node adjacent to the node for which the singularity flag is set is performed by using not the allowable approach speed of the singularity point node but the allowable approach speed of the adjacent node. For the node with the singularity flag set to 1, the allowable approach speed is not set, thus assuring that the alarm and deceleration control for the node cannot be executed.

An alarm speed calculation/storage unit 28 determines an alarm speed vw[j] at the present car position according to the allowable approach speed vap[j] at each node set by the allowable approach speed setting unit 27, the node interval Lp[j] at each node stored in the front road attribute calculation/storage unit 25, and the allowable deceleration XgLim set by the allowable deceleration setting unit 24.

Here, the distance LL[j] from the car position to each node is given by $LL[j]=(xp[1]2+yp[1]2)1/2$ when $j=1$ $LL[j]=LL[1]+Lp[2]+Lp[3]+\ldots +Lp[j]$ when $2 \leq j \leq n-1$ The alarm speed vw[j] for each node can therefore be set by the following equation.

$vw[j]=(vap[j]2+2\cdot(Kx \cdot XgLim)\cdot LL[j])1/2$ where Kx is a safety coefficient which is 0.5 in this embodiment. In other words, 50% of the allowable deceleration XgLim is taken as the safe deceleration.

An alarm decision output unit 29 compares the minimum of the alarm speeds vw[j] for the nodes determined by the alarm speed calculation/storage unit 28 with the car speed v calculated based on the output signal from the car speed sensor 5. It also compares the car speed v with the allowable approach speed vap[j] of the node having the minimum alarm speed vw[j].

When the car speed v is larger than the minimum alarm speed vw[j] and the difference between the car speed v and the allowable approach speed vap[j] is equal to or more than the allowable value vk1 (for example, 5 km/h), the alarm decision output unit 29 decides that the car is running in an overspeed state.

Figure 18:
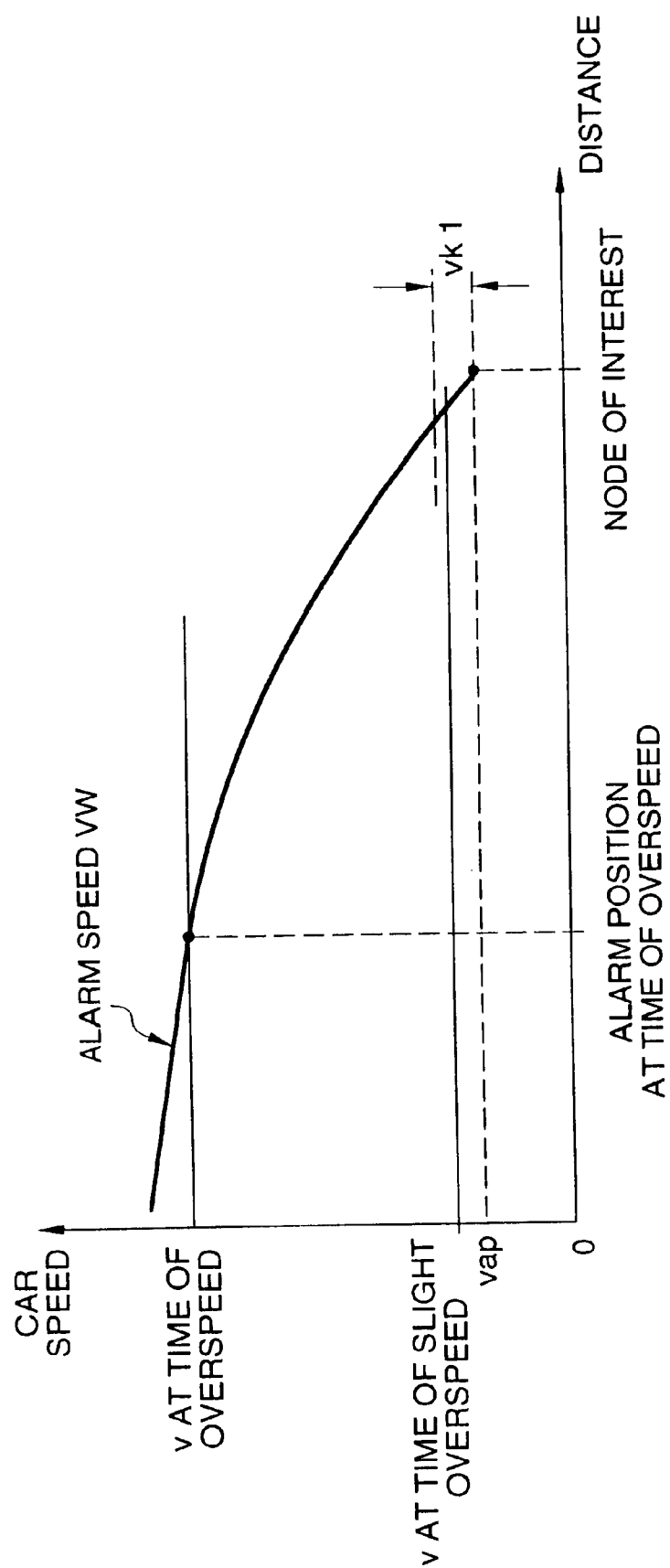
FIG. 18 is a characteristic diagram showing the relation between a car speed and an alarm speed.

Therefore, as shown in FIG. 18 when the car is traveling at a constant speed v and this car speed v somewhat exceeds the alarm speed vw[j], an alarm is issued early or deceleration control is initiated. When on the other hand the amount by which the car speed v exceeds the allowable approach speed vap[j] is less than the allowable value vk1, it is only when the car position comes very close to the position of the node under consideration that the car speed v will exceed the allowable approach speed vap[j]. At this time the alarm and the deceleration control are not performed. This is because the allowable approach speed vap incorporates a safety margin in advance and therefore no practical problem will arise.

When the node is judged by the alarm decision output unit 29 as a node to be covered by the alarm control and the driver has not performed an appropriate deceleration operation for a predetermined time (or example, 2 seconds), a deceleration decision output unit 30 decides that the node should be subjected to the deceleration control. In this embodiment, a brake pressure is detected from the output signal from the brake pressure sensor 9 and, based on the brake pressure, a check is made of whether the braking operation on the part of the driver has achieved the deceleration set by the allowable deceleration setting unit 24. If the set deceleration is not realized, the node is judged as an object for the deceleration control.

A control execution decision unit 31 checks whether or not to permit the actual control to be performed on the node that was judged by the alarm decision output unit 29 as an object for the alarm control or on the node that was judged by the deceleration decision output unit 30 as an object for the deceleration control.

That is, first, for the node that has been judged as an object for the alarm control, the control execution decision unit 31 checks whether the node of interest actually exists on the road as by reading the curve's radius of curvature rp at the node from the road attribute stored in the front road attribute calculation/storage unit 25, reading the distance LL to the node stored in the alarm speed calculation/storage unit 28, and checking the curve's radius of curvature rp and the distance LL against the degree of curvature of the road in front and the distance to the curve start point, both recognized by the road shape detection device 10. When they agree, the control execution decision unit 31 decides that the node of interest actually exists on the road and permits the execution of the alarm or deceleration control. When they do not agree, the road information in the map stored in the storage means such as CD-ROM of the navigation device 7 is considered to differ from the actual road state due to road extension or modification constructions. Thus, the control execution decision unit 31 prohibits the execution of the alarm and deceleration control for that node.

When the control execution decision unit 31 permits the execution of the alarm control or the deceleration control for the node under consideration, the alarm decision output unit 29 outputs an alarm command signal to the alarm device 11 to inform and alert the driver that the car is on the verge of entering a curve. At the same time, the deceleration decision output unit 30 outputs a deceleration command signal to the deceleration device 12, which, based on the deceleration command from the deceleration decision output unit 30, performs a forced deceleration operation as by shifting down the transmission, reducing the engine torque and braking.

As described above, this embodiment removes from the calculation of the curve's radius of curvature an inappropriate node which has, for example, an extremely short node interval. This makes it possible to calculate an appropriate curve's radius of curvature that matches the actual road curve and, based on the calculated curve's radius of curvature, set an allowable curve approach speed that will not make the driver feel incongruous.

The present invention as described above calculates, based on the node data output from the navigation device, a node interval between each node and an adjacent node and a node angle for each node; detects, based on the node interval and the node angle, a node which should be removed from the calculation of the curve's radius of curvature; and calculates the curve's radius of curvature by removing this node. Hence, if the node interval is very short, it is possible to calculate the curve's radius of curvature that approximates the actual curve and, based on this calculated curve's radius of curvature, set an appropriate allowable curve approach speed. As a result, overly sensitive alarm and deceleration controls can be avoided, alleviating the sense of incongruity the driver may have.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A road shape estimation apparatus for calculating a curve's radius of curvature based on a plurality of node data, representing road information and stored in a navigation device, comprising:
   a node interval calculation unit configured to calculate a node interval between adjacent nodes;
   a node angle calculation unit configured to calculate node angles with respect to said adjacent nodes; and
   a singularity decision unit configured to decide based on said node interval and said node angles whether at least one of said adjacent nodes is a removal point to be removed from the calculation of said curve's radius of curvature.

2. The road shape estimation apparatus according to claim 1, wherein
   said singularity decision unit is adapted to decide that at least one of said adjacent nodes is removed when said node interval is equal to or less than a preset node interval.

3. The road shape estimation apparatus according to claim 2, wherein
said preset node interval is set by multiplying a preset node interval calculation coefficient by a road width coefficient.

4. The road shape estimation apparatus according to claim 3, wherein
said preset node interval calculation coefficient is set for each road kind.

5. The road shape estimation apparatus according to claim 1, wherein
said singularity decision unit is adapted to prohibit an alarm or a deceleration control to be performed on a further node next to said removal point when an interval between said removal point and said further node is equal to or less than a preset node interval.

6. The road shape estimation apparatus according to claim 1, wherein
said singularity decision unit is adapted to prohibit an alarm or a deceleration control to be performed on a further node next to said removal point when a node angle with respect to said further node is equal to or less than a preset minimum threshold angle.

7. The road shape estimation apparatus according to claim 1, wherein
said singularity decision unit is adapted to decide that at least one of said adjacent nodes is removed when said node interval is equal to or less than a preset node interval and bending directions of said node angels are opposite each other.

8. The road shape estimation apparatus according to claim 7, wherein
said singularity decision unit is adapted to prohibit an alarm or a deceleration control to be performed on a further node next to said removal point when an interval between said removal point and said further node is equal to or less than a preset node interval.

9. The road shape estimation apparatus according to claim 7, wherein
said singularity decision unit is adapted to prohibit an alarm or a deceleration control to be performed on a further node next to said removal point when a node angle with respect to said further node is equal to or less than a preset minimum threshold angle.

10. The road shape estimation apparatus according to claim 1, wherein
said singularity decision unit is adapted to decide that at least one of said adjacent nodes is removed when said node interval is equal to or less than a preset node interval and a larger one of said node angles is equal to or more than a preset maximum threshold angle.

11. The road shape estimation apparatus according to claim 10, wherein
said preset maximum threshold angle is set by multiplying a preset reference angle by a ratio between said node interval and said preset node interval.

12. The road shape estimation apparatus according to claim 10, wherein
said singularity decision unit is adapted to prohibit an alarm or a deceleration control to be performed on a further node next to said removal point when an interval between said removal point and said further node is equal to or less than a preset node interval.

13. The road shape estimation apparatus according to claim 10, wherein
said singularity decision unit is adapted to prohibit an alarm or a deceleration control to be performed on a further node next to said removal point when a node angle with respect to said further node is equal to or less than a preset minimum threshold angle.

14. The road shape estimation apparatus according to claim 1, wherein
said singularity decision unit is adapted to decide that at least one of said adjacent nodes is removed when said node interval is equal to or less than a preset node interval and a smaller one of said node angles is equal to or less than a preset minimum threshold angle.

15. The road shape estimation apparatus according to claim 14, wherein
said preset minimum threshold angle is set by multiplying a preset reference angle by a ratio between said node interval and said preset node interval.

16. The road shape estimation apparatus according to claim 14, wherein
said singularity decision unit is adapted to prohibit an alarm or a deceleration control to be performed on a further node next to said removal point when an interval between said removal point and said further node is equal to or less than a preset node interval.

17. The road shape estimation apparatus according to claim 14, wherein
said singularity decision unit is adapted to prohibit an alarm or a deceleration control to be performed on a further node next to said removal point when a node angle with respect to said further node is equal to or less than a preset minimum threshold angle.

18. The road shape estimation apparatus according to claim 1, wherein
said singularity decision unit is adapted to decide that at least one of said adjacent nodes positioned at middle of four consecutive nodes is removed when said node interval is equal to or less than a preset node interval and an angle formed by a line connecting first two of said four consecutive nodes and a line connecting last two nodes of said four consecutive nodes is equal to or less than a preset minimum threshold angle.

19. The road shape estimation apparatus according to claim 18, wherein
said singularity decision unit is adapted to prohibit an alarm or a deceleration control to be performed on a further node next to said removal point when an interval between said removal point and said further node is equal to or less than a preset node interval.

20. The road shape estimation apparatus according to claim 18, wherein
said singularity decision unit is adapted to prohibit an alarm or a deceleration control to be performed on a further node next to said removal point when a node angle with respect to said further node is equal to or less than a preset minimum threshold angle.

21. A method for calculating a curve's radius of curvature based on a plurality of node data, representing road information and stored in a navigation device, comprising:
calculating a node interval between adjacent nodes by a node interval calculation unit;
calculating a node angles with respect to said adjacent nodes by a node angle calculation unit; and
deciding based on said node interval and said node angles whether at least one of said adjacent nodes is a removal point to be removed from the calculation of said curve's radius of curvature by a singularity decision unit.

* * * * *